June 28, 1932.    G. H. ROSE    1,865,337
CONVEYER
Filed Nov. 21, 1931    3 Sheets-Sheet 1
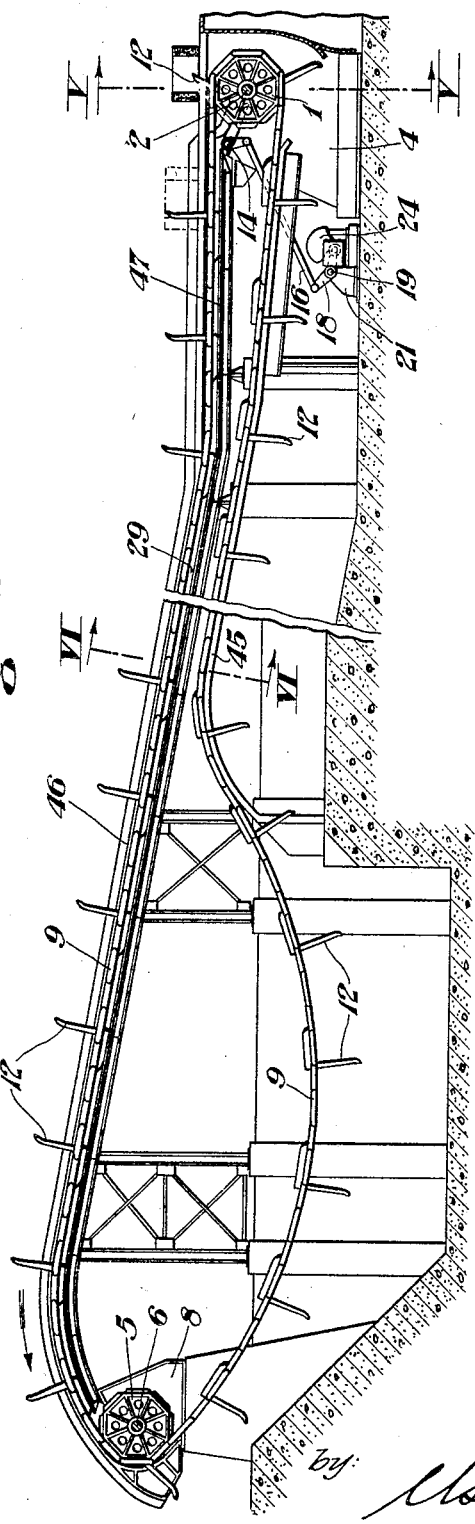
Inventor:
GEORGE H. ROSE,
by Meira & Rauber
his Attorneys.

June 28, 1932.  G. H. ROSE  1,865,337
CONVEYER
Filed Nov. 21, 1931  3 Sheets-Sheet 2

Inventor:
GEORGE H. ROSE,
by Usina & Rauber,
his Attorneys.

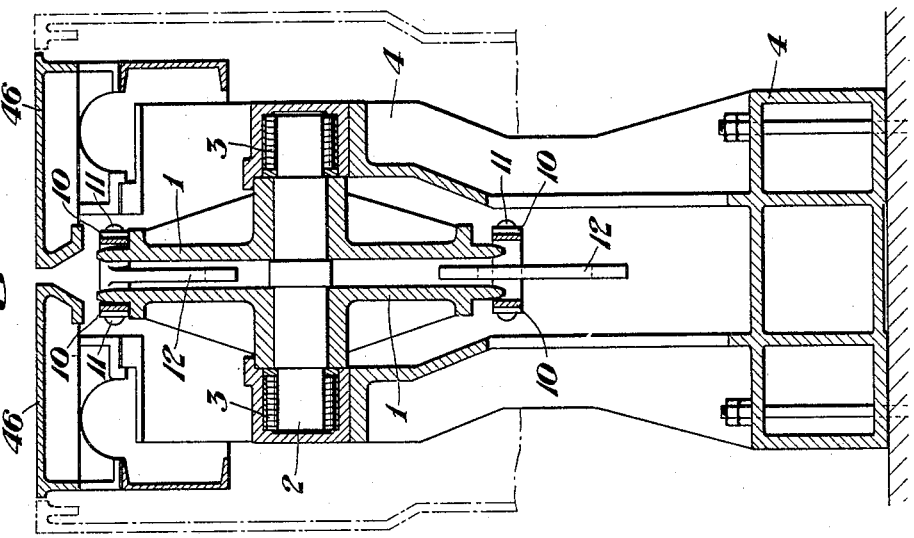
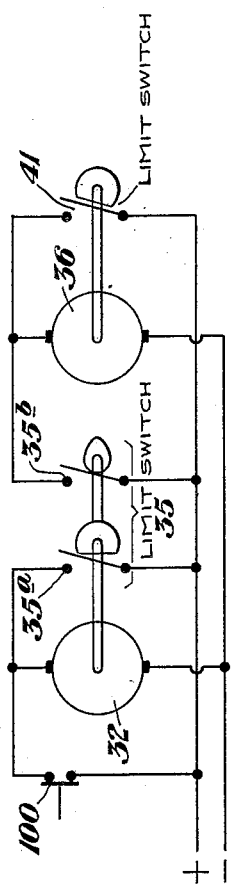
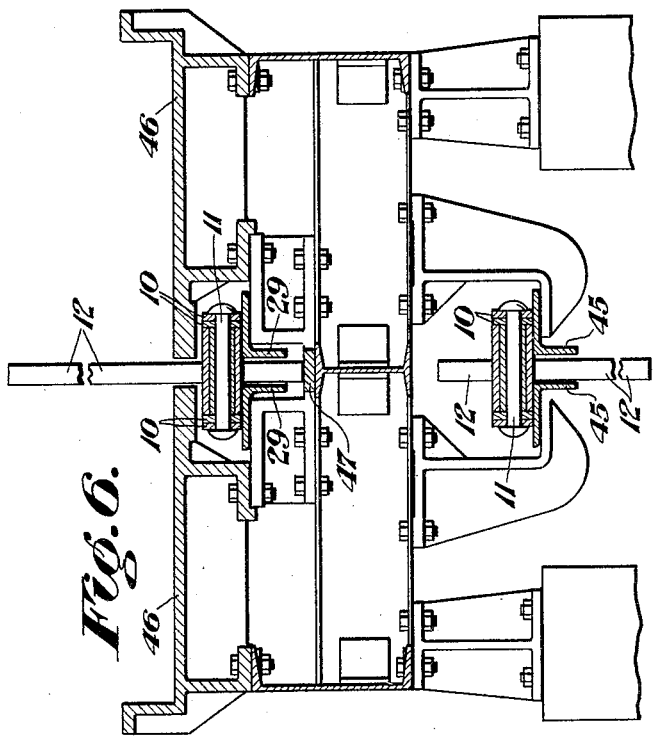

Patented June 28, 1932

1,865,337

UNITED STATES PATENT OFFICE

GEORGE H. ROSE, OF CLEVELAND HEIGHTS, OHIO

CONVEYER

Application filed November 21, 1931. Serial No. 576,558.

This invention relates to conveyers, and while not limited thereto relates more particularly to conveyers for conveying reeled bundles of rods and wire, or the like, and has for one of its objects the provision of a novel dog element and operating mechanism whereby the dog may be raised completely through the bundle, thus preventing the bundle from collapsing when the dog engages the same.

Another object is the provision of a novel control means for the dog operating and conveyer operating mechanisms.

In the drawings:

Figure 1 is a side elevation of a conveyer constructed in accordance with this invention.

Figure 2 is a plan view thereof.

Figure 5 is a sectional elevation taken on the line V—V of Figure 1.

Figure 6 is a sectional elevation taken on the line VI—VI of Figure 1.

Figure 7 is a diagram of the control circuits.

Figure 3:
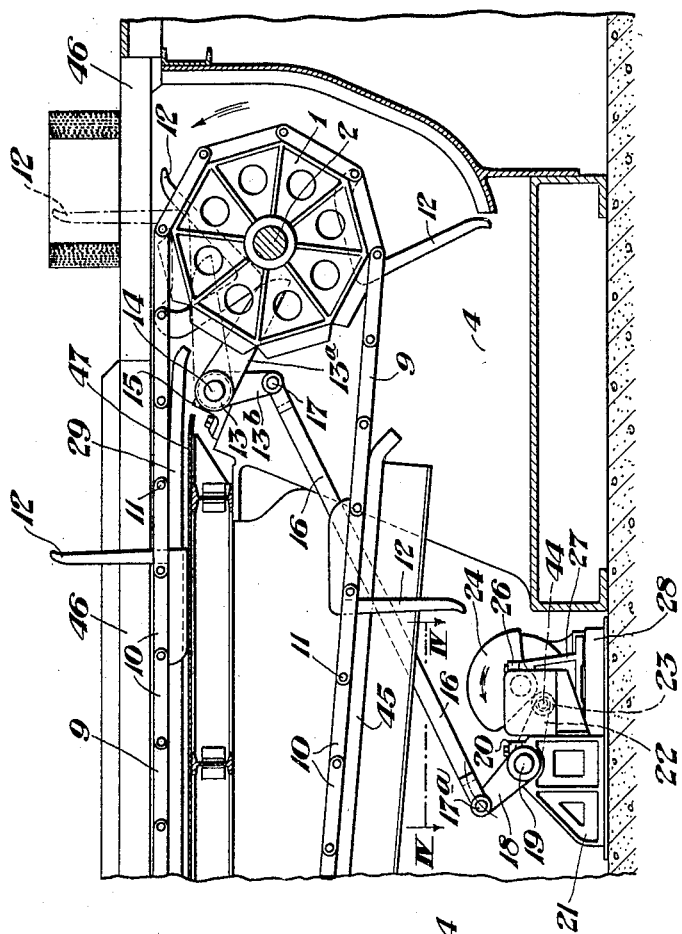
Figure 3 is an enlarged fragmentary elevation of the work receiving end of the conveyer.
Figure 4:
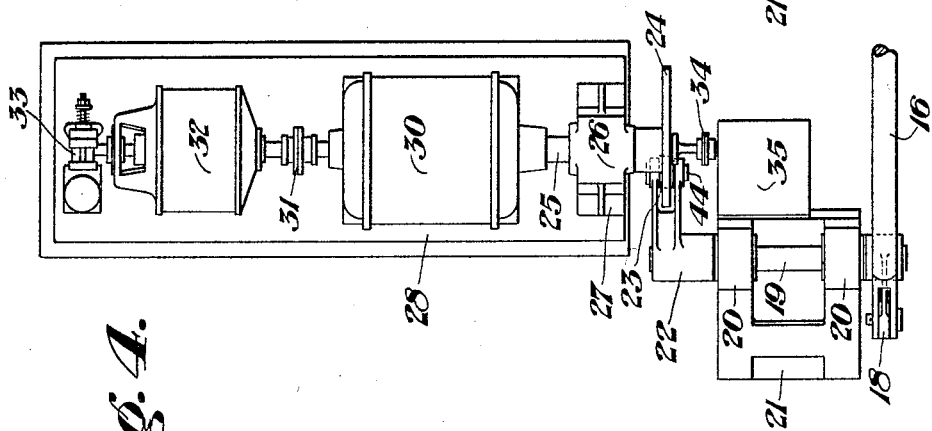
Figure 4 is a fragmentary plan view taken on the line IV—IV of Figure 3.

Referring more particularly to the drawings, the numeral 1 designates a pair of spaced tail sprockets which are supported on a tail shaft 2 journaled in tail shaft bearings 3 on a base member 4. A head sprocket 5 is supported on a shaft 6 journaled in bearings 7 on a base member 8.

A continuous conveyer chain 9 composed of links 10 connected by pins 11 is trained over the sprockets 1 and 5. The chain 9 carries a plurality of crank-shaped work-engaging dogs 12, which dogs are pivotally mounted on selected ones of the pins 11 of the chain at the free end of one of their arms so that they will normally hang below the chain unless they are supported by suitable guide members. A pair of spaced guides 29 extend below the upper stretch or strand of the conveyer chain 9 between the tail sprockets 1 and head sprocket 5, for guiding and supporting the conveyer chain. A supporting plate 47 extends parallel with and below the guides 29 for supporting the dogs 12 in upright or work-engaging position. The bottom strand or stretch of the conveyer 9 is supported by lower guides 45 so as to prevent undue sagging thereof.

A suitable superstructure is provided throughout the length of the conveyer for supporting the guides and for supporting surface plates 46, over which the bundles of work are conveyed by the conveyer.

A suitable dog lifting device is provided adjacent the tail sprockets 1 and comprises a bell-crank 13 composed of levers $13^a$ and $13^b$ secured to a shaft 14 which is journalled in bearings 15 on the base member 4. A connecting-rod 16 is pivotally secured to the lever $13^b$ on the shaft 14 by means of a pin 17, and is pivotally connected at its other end to a lever arm 18 by a pin $17^a$. The lever arm 18 is keyed to a shaft 19 journaled in bearings 20 on a base 21. Lever shaft 19 has keyed thereto a lever arm 22 having a roller 23 journaled at its outer end on a pin 44.

The roller 23 is adapted to engage a cam 24 which is keyed to a cam drive shaft 25 journaled in bearings 26 on a bracket 27 resting on a motor base 28. The cam-shaft 25 is connected by suitable gearing 30 and a coupling 31 to a drive motor 32 having a suitable brake 33. A limit switch 35 is directly connected to the cam-shaft 25 by a coupling 34. The switch 35 may be of any of several standard constructions, but is illustrated diagrammatically in Figure 7 of the drawings as a cam operated switch having cam operated contacts $35^a$ and $35^b$.

The drive unit for the conveyer comprises a motor 36 having a brake 37, which motor is connected by a coupling 38 to a gear reduction train 39. The gear reduction train 39 has its drive shaft $39^a$ connected to the head sprocket shaft 6 by a coupling 40. A limit switch 41 is mounted on the base of the gear reduction train, and is connected to the drive shaft $39^a$ by gears 42 and 43. The switch 41 may be of any of several standard constructions, but is shown diagrammatically in Figure 7 of the drawings as a cam operated limit switch. The switch 41 is adapted to limit the operation of the conveyer drive motor 36.

The dogs 12 are spaced on the chain 9 at equal distances, in accordance with the class of material being conveyed.

The operation of the apparatus is intermittent; that is, the apparatus being motionless, a bundle or coil is delivered to the conveyer, a dog is moved up into the bundle or coil, and the conveyer chain moves forward a distance equal to the spacing of the dogs 12, and stops in readiness to receive another bundle.

This intermittent operation proceeds in the following manner: A bundle of material is delivered to a predetermined limited location on the conveyer surface plates 46. A standard switch (shown in Figure 7 as a push-button 100) for the motor 32 of the dog lifting mechanism is manually operated to start the motor 32. As the motor 32 is started contact 35$^a$ of limit switch 35 will be closed to complete a separate circuit to the motor 32 so as to maintain said motor in operation for a predetermined cycle. As the motor 32 operates, cam drive shaft 25 will rotate to move cam 24 against the roller 23 on the lever arm 22, so as to rock the shaft 14 and levers 13$^a$ and 13$^b$. As the lever 13$^a$ is rocked upwardly it will engage and move one of the dogs 12, which is in line with said lever, upwardly into engagement with the work or bundle of rods. While the motor 32 is continuing to rotate, the limit switch 35 will be operated so that when the dog 12 is raised to its uppermost position the contact 35$^b$ of the switch 35 will be closed so as to make a circuit to the conveyer drive motor 36, thus starting the motor 36 and causing the conveyer chain to move forwardly toward the head sprocket.

As the motor 36 is operated in response to the circuit through contact 35$^b$ it will operate the limit switch 41 to make a circuit to the motor 36 for a predetermined length of time to advance the conveyer chain a predetermined distance, after which the switch 41 will automatically open to stop the motor 36.

As the motor 36 operates the conveyer head sprocket and the chain 9 is advanced forwardly the dog 12 which has been raised and supported by the lever arm 13$^a$ will be moved onto the guide plate 47 so as to hold the dog in its upright position until it has reached the end of the guide plate adjacent the head sprocket 5, at which time the head sprocket supports the dog, the dog receding through the conveyer plates as it travels with the head sprocket.

By an examination of the diagram of Figure 7 of the drawings it will be noted that the start of the motor 36 is interlocked with the control of the motor 32 through the limit switch 35 so that the motor 36 can not be operated to advance the conveyer chain 9 until the motor 32 has operated to raise the dog 12 into the bundle of work to be conveyed.

While I have shown and described one specific embodiment of my invention, it will be understood that I do not wish to be limited thereto, since various modifications may be made in my invention without departing from the scope thereof, as defined in the appended claims.

I claim:

1. A conveyer for conveying coils of rods, wire and the like, comprising a supporting frame, a head sprocket and a pair of tail sprockets, said tail sprockets being spaced horizontally to permit work-engaging dogs to pass therebetween, a conveyer chain trained over said sprockets, crank-shaped dogs pivotally mounted on said chain, guides between said sprockets under the upper stretch of said conveyer chain for supporting said chain, a support extending below and parallel with said guides and adapted to be engaged by said dogs to hold said dogs in work-engaging position, mechanical means for swinging said dogs up into work-engaging position, automatic control means for limiting the operation of said mechanical means, power means for operating said conveyer head shaft, means interlocked with said automatic control means for controlling the starting of said head shaft operating means, and means for limiting the operation of said head shaft operating means.

2. A conveyer for conveying bundles or coils of rods, wire and the like, comprising a supporting frame, head and tail sprockets, means for driving said head sprocket, a conveyer chain trained over said sprockets, dogs pivotally mounted on said chain, supporting guides under and extending parallel with the upper stretch of said conveyer chain for supporting said dogs in work-engaging position, power operated means adjacent the tail sprocket for moving said dogs into work-engaging position prior to the engagement of said dogs with said guide, automatic control means for moving said dogs into work-engaging position, and means interlocked with said control means for controlling the operation of said head sprocket driving means.

3. A conveyer for conveying coils or bundles of rods, wire and the like, comprising head and tail sprockets, means for driving said head sprocket, a conveyer chain trained over said sprockets, crank-shaped dogs having one end pivotally secured to said chain and being adapted to hang below said chain by gravity, a supporting guide under and extending parallel with the upper stretch of said conveyer chain for supporting said dogs in work-engaging position, power operated means adjacent the tail sprocket for moving said dogs into work-engaging position prior to the engagement of said dogs with said guide, automatic control means for limiting the operation of said power operated means, and means interlocked with said control means for controlling the operation of said head sprocket driving means.

4. A conveyer for conveying coils of rods, wire and the like, comprising head and tail sprockets, means for driving said head sprocket, a conveyer chain trained over said sprockets, crank-shaped dogs having one end pivotally secured to said chain and being adapted to hang below said chain by gravity, a supporting guide under and extending parallel with the upper stretch of said conveyer chain for supporting said dogs in work-engaging position, a rock shaft journaled adjacent said tail sprocket, a lever on said shaft adapted to engage one of said dogs when said shaft is rocked to move said dog up into work-engaging position prior to the engagement of the dog with said guide, power operated means for rocking said shaft, automatic control means for limiting the operation of said power operated means, and means interlocked with said control means for controlling the operation of said head sprocket driving means.

5. A conveyer for conveying coils of rods, wire and the like, comprising head and tail sprockets, electrically operated means for driving said head sprockets, a conveyer chain trained over said sprockets, crank-shaped dogs having one end pivotally secured to said chain and adapted to hang below said chain by gravity, a supporting guide extending parallel to the upper stretch of said conveyer chain and supporting said dogs in work-engaging position, a rock shaft journaled adjacent said tail sprocket, a lever on said shaft adapted to engage one of said dogs when said shaft is rocked so as to move said dog up into work-engaging position prior to the engagement of the dog with said guide, electrically operated means for rocking said shaft, a limit switch for limiting the operation of said electrically operated means for rocking the shaft, a second switch mechanically interlocked with said limit switch for energizing said electrically operated driving means for said head sprocket, and a separate switch for automatically limiting the operation of said electrically operated driving means for said head sprocket.

In testimony whereof I have hereunto set my hand.

GEORGE H. ROSE.